United States Patent
Weiser et al.

(10) Patent No.: US 8,500,372 B2
(45) Date of Patent: Aug. 6, 2013

(54) TURF REINFORCEMENT MAT HAVING MULTI-DIMENSIONAL FIBERS AND METHOD FOR EROSION CONTROL

(75) Inventors: Sidney M. Weiser, Ringgold, GA (US);
Patti Weaver, Ringgold, GA (US);
Warren Sickler, Ringgold, GA (US)

(73) Assignee: Propex Operating Company LLC, Chattanooga, TN (US)

( * ) Notice: Subject to any disclaimer, the term of this patent is extended or adjusted under 35 U.S.C. 154(b) by 0 days.

(21) Appl. No.: 12/880,789

(22) Filed: Sep. 13, 2010

(65) Prior Publication Data

US 2011/0002747 A1    Jan. 6, 2011

Related U.S. Application Data

(62) Division of application No. 10/626,260, filed on Jul. 24, 2003, now Pat. No. 7,820,560.

(51) Int. Cl.
*E02D 17/20* (2006.01)

(52) U.S. Cl.
USPC .............. 405/302.7; 405/302.4; 405/302.6; 442/32; 442/35; 442/49; 442/335; 442/337

(58) Field of Classification Search
USPC .............. 405/302.4, 302.6, 302.7; 442/1, 442/32, 35, 49, 50, 57
See application file for complete search history.

(56) References Cited

U.S. PATENT DOCUMENTS

| | | | |
|---|---|---|---|
| 2,627,644 A | 2/1953 | Foster | |
| 2,635,648 A | 4/1953 | Foster | |
| 2,757,434 A | 8/1956 | McCord | |
| 2,771,661 A | 11/1956 | Foster | |
| 3,914,488 A | 10/1975 | Gorrafa | |
| 3,934,421 A | 1/1976 | Daimler et al. | |
| 4,002,034 A | 1/1977 | Muhring et al. | |
| 4,002,596 A | 1/1977 | Murch | |
| 4,181,450 A | 1/1980 | Rasen et al. | |
| 4,252,590 A | 2/1981 | Rasen et al. | |
| 4,329,392 A | 5/1982 | Bronner | |
| 4,421,439 A | 12/1983 | ter Burg et al. | |
| 4,472,086 A | 9/1984 | Leach | |
| 4,762,581 A | 8/1988 | Stancliffe et al. | |
| 4,790,691 A * | 12/1988 | Freed | ............... 405/263 |
| 4,950,531 A | 8/1990 | Radwanski et al. | |
| 5,007,766 A | 4/1991 | Freed | |
| 5,182,162 A | 1/1993 | Andrusko | |
| 5,224,292 A | 7/1993 | Anton | |
| 5,255,998 A | 10/1993 | Beretta | |

(Continued)

FOREIGN PATENT DOCUMENTS

JP    7290627    11/1995

*Primary Examiner* — Sean Andrish

(74) *Attorney, Agent, or Firm* — Husch Blackwell LLP

(57) ABSTRACT

A turf reinforcement mat comprises at least one polymer net layer; a non-woven mat comprising a plurality of multi-dimensional polymer fibers; and, a polymer yarn, stitching the net layer to the non-woven mat. A method for erosion control and revegetation facilitation comprises providing a turf reinforcement mat comprising at least one polymer net layer; a non-woven mat comprising a plurality of multi-dimensional polymer fibers; and, a polymer yarn, stitching the net layer to the non-woven mat; laying the turf reinforcement mat on a section of ground to be reinforced; securing the turf reinforcement mat to the ground; distributing soil and seed onto the turf reinforcement mat such that the section of ground is quickly revegetated and thereby protected from further erosion.

7 Claims, 2 Drawing Sheets

U.S. PATENT DOCUMENTS

| | | |
|---|---|---|
| 5,326,192 A | 7/1994 | Freed |
| 5,419,659 A | 5/1995 | Mercer |
| 5,431,991 A | 7/1995 | Quantrille et al. |
| 5,591,523 A | 1/1997 | Aneja |
| 5,616,399 A | 4/1997 | Theisen |
| 5,626,961 A | 5/1997 | Aneja |
| 5,651,641 A | 7/1997 | Stephens et al. |
| 5,736,243 A | 4/1998 | Aneja |
| 5,817,740 A | 10/1998 | Anderson et al. |
| 5,849,645 A * | 12/1998 | Lancaster ..................... 442/5 |
| 5,851,089 A | 12/1998 | Beretta |
| 5,951,202 A | 9/1999 | Brown |
| 5,972,463 A * | 10/1999 | Martin et al. ................. 428/95 |
| 5,972,505 A | 10/1999 | Phillips |
| 6,093,491 A | 7/2000 | Dugan et al. |
| 6,139,955 A | 10/2000 | Girgis |
| 6,171,984 B1 | 1/2001 | Paulson et al. |
| 6,343,895 B1 | 2/2002 | Yanada et al. |
| 6,509,285 B1 | 1/2003 | Yeh |
| 6,855,650 B1 * | 2/2005 | Bohannon, Jr. ................ 442/32 |
| 7,820,560 B2 | 10/2010 | Weiser et al. |

* cited by examiner

TURF REINFORCEMENT MAT HAVING MULTI-DIMENSIONAL FIBERS AND METHOD FOR EROSION CONTROL

CROSS-REFERENCE TO RELATED APPLICATIONS

This application is a divisional of application Ser. No. 10/626,260 filed on Jul. 24, 2003 now U.S. Pat. No. 7,820,560.

BACKGROUND OF THE INVENTION

Broadly, this invention relates to turf reinforcement mats. Turf reinforcement mats, or TRM's promote revegetation, provide erosion protection and improve water quality on slopes and in channels. More specifically, the present invention relates to the polymer fiber filler material used in the construction of a permanent turf reinforcement mat. The polymer filler employed has multidimensional fiber cross sections.

Known turf reinforcement mats in the art are typically fabricated in one of the following three ways: (1) polymer monofilament or natural organic fibers are stitch bonded together; (2) polymer monofilament can be fused with netting or (3) polymer monofilaments are woven into erosion control structures.

The patent literature does include several attempts at producing a polymeric geotextile. For example, U.S. Pat. No. 3,934,421 discloses a matting comprising a plurality of amorphous thermoplastic filaments used for stabilizing road beds. The thermoplastic may be any melt-spinnable polymer, which is spun into loops about 10 times the diameter of the filament. Matting is laid flat on the ground where repeated traffic thereon sinks the matting below the surface. The thickness of the matting tends to fill with sediment thereby stabilizing the surface. The matting may also be used for drainage in wet road beds. The porosity of the matting acts as a moisture conduit, draining excess moisture into an otherwise provided adjacent drainage area. It is briefly noted that the filaments with a non-round cross section have a greater load bearing capacity than filaments with round cross sections. Hence, the thickness of a mat for a given load may be decreased when using non-round filaments relative to the load capacity of round cross section filaments.

U.S. Pat. No. 4,181,450 discloses an erosion control matting having an open mesh reinforcing lattice over which a plurality of continuous melt-spun polymer filaments are overlaid and interlocked with the lattice. This structure is positioned over a fibrous backing member intended to capture and retain soil. The polymers contemplated include polyolefins, polyesters, and polyamides.

U.S. Pat. No. 4,329,392 discloses a multilayer netting for hydraulic engineering and erosion control. One layer of the matting is a "gripper layer" containing melt-spun polymer filaments of a larger diameter fused to a plurality of intersecting melt-spun polymer filaments of a smaller diameter. The gripper layer is placed on and reaches into fine sediment particles, thereby interlocking with the surface to be protected from erosion. A "grain rearrangement inhibiting" fiber layer is interspersed in the voids of the gripper layer, and acts as a filter prevent escape of the finest particles.

U.S. Pat. No. 4,472,086 discloses a geotextile fabric comprising first and second groups of synthetic threads, the two groups disposed essentially perpendicular to one another. A third group of threads stitch-bonds the first two groups together loosely. Use of the geotextile fabric as asphalt road repair is disclosed.

U.S. Pat. No. 5,182,162 discloses a self-bonded non-woven web and thermoplastic net-like web composite comprising at least one layer of fibrous non-woven web, which itself includes radially disposed filaments and at least one layer of aligned thermoplastic elements. The fibers can be made from a variety of polymers including polyolefins such as polyethylene, polypropylene and polyesters, and are made by extruding through spinnerettes having cross sections that can be circular, elliptical, or tri-lobal. The net-like webs disclosed therein are suitable for use as a geotextile or agricultural ground cover and useful in controlling erosion.

U.S. Pat. No. 5,851,089 discloses a geogrid composed of multiple layers of flexible mesh structures. The layers are offset from one another such that the mesh openings are not superimposed. The multiple layers are fastened to one another, and the multilayer structure is stretched in either one direction, i.e., machine direction, or in two orthogonal directions, i.e., machine direction and transverse direction. Gaps in the resulting geogrid are of various sizes, ensuring that fill sediment of various sizes may infiltrate and firmly hold the geogrid in place. The geogrid is useful in reinforcement of paved and unpaved roads, and in preventing erosion and stabilizing fill material.

U.S. Pat. No. 6,171,984 discloses a meshwork used for erosion control and soil stabilization, wherein two sets of strands, orthogonally disposed to one another, are connected with at least one set of tying strands and a bonding agent. The strands may be made of thermoplastic or glass fibers. Use of fiberglass in the geosynthetic material improves its resistance to environmental and biological wear.

While attempts have been made heretofore to provide a turf reinforcement mat having improved drainage capability and tensile strength, the art has not provided a mat that provides improved revegetation, erosion protection and water quality on slopes and in channels.

BRIEF SUMMARY OF THE INVENTION

It is therefore, an aspect of the present invention to provide a turf reinforcement mat which promotes improved revegetation, provides erosion protection and improved water quality on slopes.

It is another aspect of the present invention to provide a turf reinforcement mat employing a polymer filler comprising a multi-dimensional fiber, providing an increase in surface area.

It is yet another aspect of the present invention to provide a method for erosion control and revegetation facilitation employing the turf reinforcement mat of the present invention.

At least one or more of the foregoing aspects, together with the advantages thereof over the known art relating to turf reinforcement mats, which shall become apparent from the specification which follows, are accomplished by the invention as hereinafter described and claimed.

In general the present invention provides a turf reinforcement mat comprising at least one polymer net layer; a non-woven mat comprising a plurality of multi-dimensional polymer fibers; and, a polymer yarn, stitching the net layer to the non-woven mat.

The present invention also includes a method for erosion control and revegetation facilitation comprising providing a turf reinforcement mat comprising at least one polymer net layer; a non-woven mat comprising a plurality of multi-dimensional polymer fibers; and, a polymer yarn, stitching the net layer to the non-woven mat; laying the turf reinforcement mat on a section of ground to be reinforced; securing the turf reinforcement mat to the ground; distributing soil and seed onto the turf reinforcement mat such that the section of ground is quickly revegetated and thereby protected from further erosion.

DETAILED DESCRIPTION OF THE INVENTION

The present invention generally relates to geotextile fabrics used to prevent erosion of exposed surfaces and to facilitate the revegetation of a previously eroded surface. Such an article is commonly termed a turf reinforcement mat (TRM). The TRM of the present invention comprises two polypropylene nets that form the top and bottom with a polymer fiber filler. A polymer yarn is used to stitch the fiber and nets together.

Figure 1:
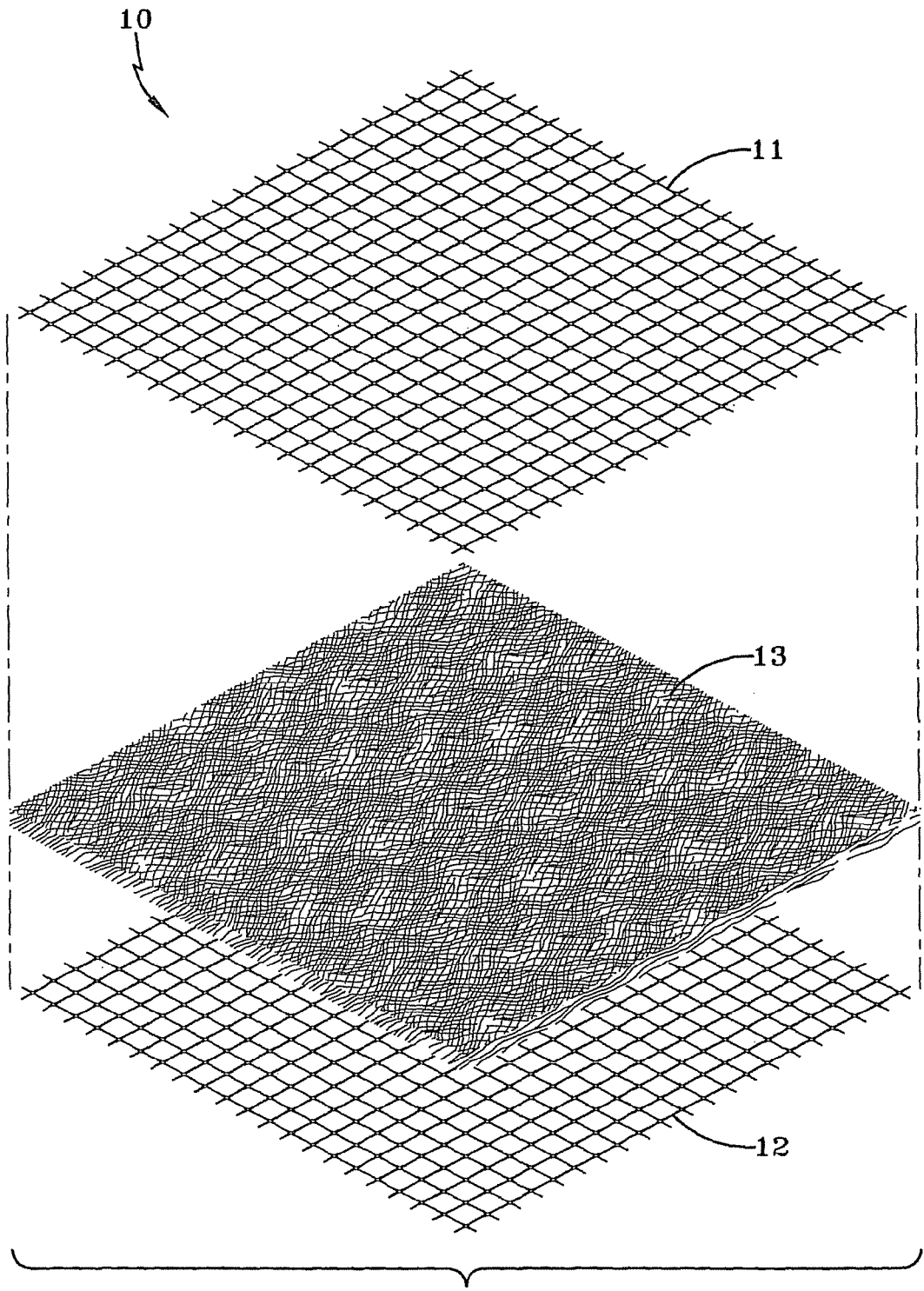
FIG. 1 is an exploded view depicting three layers of a turf reinforcement mat, according to the present invention, and their orientation.

With reference to FIG. 1, the TRM of the present invention, indicated generally by the numeral 10, is depicted in exploded fashion revealing a first, or upper net 11, a second, or lower net 12 and a non-woven mat 13 of fiber filler material, which is located between the first and second nets. The first and second nets are made of one or more thermoplastic polymers. The polymers used in the net layer may include polyolefins, polyesters, polyamides and blends thereof, with polypropylene being preferred. The net layers have an open grid pattern of squares or rectangles, from about 0.625 to 7.62 cms per side, with 1.27 to 5.08 cms preferred. While the preferred embodiment of TRM 10 comprises first and second nets, it is within the scope of the present invention to provides TRM's using only one of the first or second nets, with the non-woven mat 13.

Figure 3A:
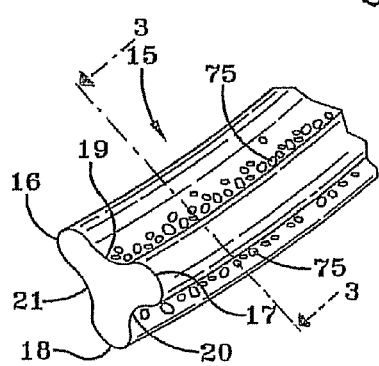
FIG. 3A is a perspective view of the multi-dimensional filament of FIG. 3.
Figure 3:
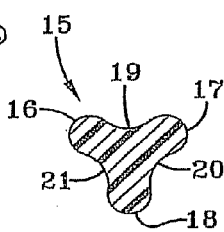
FIG. 3 is a cross-sectional view of a portion of a multi-dimensional filament, forming the mat layer of a turf reinforcement mat.
Figure 4:
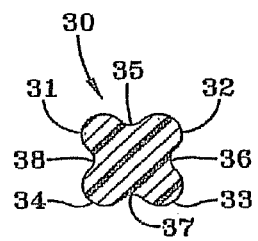
FIGS. 4-6 are cross-sectional views of alternative multi-dimensional filaments that can be employed to form the mat layer of a turf reinforcement mat.
Figure 5:
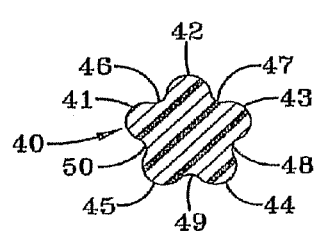
Figure 6:
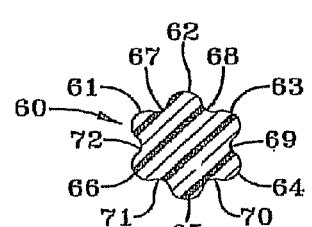

Current fibers used in the construction of TRM's are round or oval in shape. The non-woven mat 13 of the TRM of the present invention consists of multidimensional fibers, indicated singly by the numeral 15 in FIG. 3A. The fiber 15 is characterized herein as multi-point, multi-lobal or multi-dimensional and as depicted in FIG. 3A, provides three separate points or edges, 16, 17 and 18 and three grooves or channels 19, 20 and 21, between the points. Due to the geometric orientation of the fiber there is an increase in surface area with grooves/channels along the fiber 15. The fiber 15 provides a minimum of three points but are not limited to three when viewing a cross-section of the fiber. With reference to FIGS. 4-6 for instance, alternative fibers 30, 40 and 50 respectively are depicted. Fiber 30 provides four edges or points, 31-34 and four channels, 46-51. Fiber 60 provides six edges or points, 61-66 and six channels, 67-72. For purposes of discussion herein, reference shall be made to the fiber 15, with the understanding that it is representative of a fiber having a multipoint geometric shape and that practice of the present invention is not limited to the specific form of fiber having three edges and three channels.

The fiber 15 is extruded via a die that forms the multipoint geometric shape. This shape is made in the extrusion process of the fiber. The unique geometric orientation-multipoint cross-section of the fiber captures sediment 75, (FIG. 3A) and water, which assist in greater vegetation establishment. The sediment and moisture is captured in the grooves/channels (16/19 etc.) of the fiber, which enhances seed germination and root establishment. The fiber allows for greater degree of crimp amplitude due to the geometric orientation of the fiber, which in turn provides interlocking of fibers within the matrix of the TRM. This combination along with a 40 percent greater surface area allows for a loftier product when compared to the standard monofilament fiber products. Resiliency data showed a 10 percent increase over the standard round or oval monofilament. Increased loft for ease of plant growth is essential in a TRM's functionality. The TRM of the present invention 10, revealed seed germination improvements of 30 to 40 percent over the standard and commonly used monofilament fiber TRM when tested in an independent third party lab. In bench-scale shear test, a partial vegetated plot using the TRM 10 revealed a 17 percent improvement.

The fiber 15 is polymer based, such as polyolefins, polyesters, polyamides and blends thereof, with polypropylene being preferred. The fiber 15 is extruded through a die that forms the unique multidimensional shape, at temperatures in excess of 400° F. (204° C.), that provides the multipoint cross-sectional fiber. The fiber is extruded through a water quench bath at temperatures of 70° C. The fiber is then pulled through several blowers and dryers to remove the excess water from the channels of the fiber. The fiber is then drawn into the oven at temperatures of 280+/−3° C. and draw ratio of 6.5/1. Each fiber is one continuous strand (minimum of 160 holes per die) which is wound up on a winder to form a package or spool. Deniers of the fiber 15 range from about 300 (333 decitex) to about 2000 (2222 decitex) with from about 500 (555 decitex) to about 1100 (1222 decitex) being preferred, irrespective of the actual cross-sectional geometry. It is to be appreciated that the drawings depict an idealized multipoint cross-section for the fibers, where each edge or lobe, e.g., 16, 17, 18, and channel e.g., 19, 20 and 21, is uniform. In reality, the edges and channels are not symmetrical or sharply defined, as a result of quenching; however, the fibers do have distinct edges and channels, so as to provide a multi-dimensional geometry.

Figure 2:
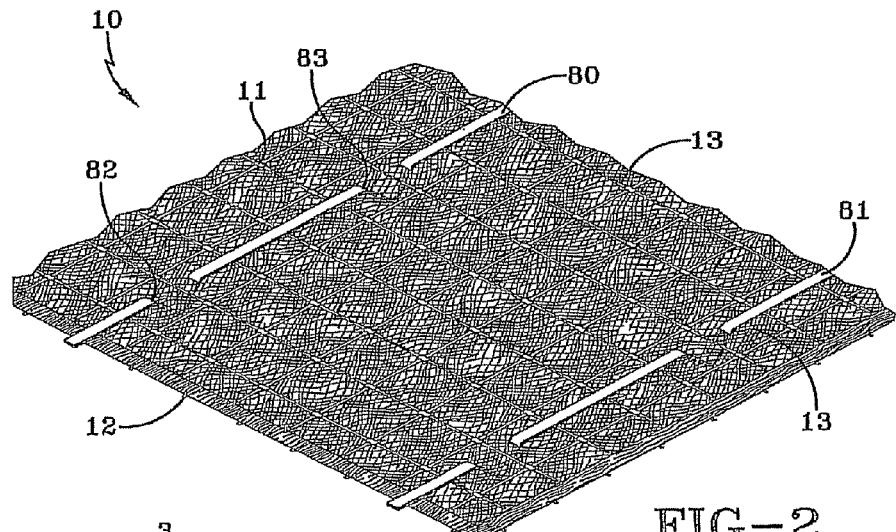
FIG. 2 is a perspective view of a turf reinforcement mat, according to the present invention.

In a secondary process, the fiber from several packages forms a toe line that is fed through a mechanical crimper and cutter. The crimp box pressure is set at 0.5+/−bar and cutting wheel spacing of 4.6 inches (11.68 cm). In the practice of this invention, the individual polymer fibers 15 are cut to a length of from about 2 inches (5 cm) to about 12 inches (30 cm), with from about 3 inches (7.6 cm) to about 7 inches (17.8 cm) being preferred. The cut fiber is dumped into a hopper that feeds into a Meyer machine. The fiber is sandwiched between first and second nets, 11 and 12. The first and second nets are stitched together using polypropylene, or other, yarn 80, 81 (FIG. 2), stitching with a needle spacing of about 3 inches (7.62 cm) between 80 and 81, except at selvages, which is 1 inch (2.54 cm). Approximate dimensions between stitches 82 and 83 ranges between about 1 to 2 inches (2.54 to 5.08 cm). It is to be appreciated that other spacings are within the scope of the invention, as stitching is not a necessary limitation. The final product (TRM) is classified as a rolled good.

Specific embodiments of the present invention involve methods for preventing erosion control or promotion of revegetation of a barren or previously eroded area, or both. It is believed that the increased surface area of the filler fibers of the present invention provide a great surface area on which runoff water can drain without damaging, i.e., eroding, the underlying soil. Further, the irregularly shaped voids of the present turf reinforcement mat provide ample space into which sediment, soil and seed, if any, can fall, thereby holding down the mat as well as facilitating its incorporation into/onto the surface to be protected.

For example, the present invention includes a method for erosion control and revegetation facilitation which comprises providing a turf reinforcement mat comprising at least one polymer net layer; a non-woven mat comprising a plurality of multi-dimensional polymer fibers; and, a polymer yarn, stitching the net layer to the non-woven mat; laying the turf reinforcement mat on a section of ground to be reinforced; securing the turf reinforcement mat to the ground; distributing soil and seed onto the turf reinforcement mat such that the section of ground is quickly revegetated and thereby protected from further erosion.

A series of performance-related index tests have been developed by the Erosion Control Technology Council (ECTC) to make rolled erosion control product (RECP) testing more cost-effective and time-efficient. Using the turf reinforcement mats of the present invention as RECP's, these testing methods were employed for RECP characterization tests which demonstrates efficacy of the invention. First, a brief background on RECP characterization, is provided as follows.

Soil Loss and The Soil Loss Ratio.

When used on slopes, the primary consideration of RECP systems is their ability to reduce soil loss caused by raid and immediate runoff. Soil loss ratio is equal to the reduction in soil loss when using a specific RECP system compared to the comparable bare soil (control) condition.

Permissible Shear Design.

Flowing water in channels imposes shear stress on the sides and bottom of the channel. In the permissible shear stress of an RECP used to line the channel is greater than the imposed shear, the lining is considered to provide acceptable erosion resistance.

Mulching and RECP Longevity.

RECPs often are used to provide short-term mulching, along with erosion protection, aimed at nurturing vegetation growth. As a result, there is a need to evaluate the effectiveness of an RECP in nurturing initial seed germination. Additionally, vegetation may require varying times to develop sufficiently to provide significant erosion protective cover. Times may range from 6 weeks in humid environments to several years in arid conditions. Some RECPs are required to provide permanent turf reinforcement. In all cases the RECP must be shown to have the appropriate longevity.

Testing Approach

ECTC's Slope Erosion Test.

The ECTC test method titled, "Standard Index Test Method for the Determination of Unvegetated Rolled Erosion Control Product (RECP) Ability to Protect Soil from Rain Splash and Associated Runoff Under Bench-Scale Conditions" establishes the procedures for evaluating the ability of Rolled Erosion Control Products (RECPs) to protect soils from rain splash and immediate runoff-induced erosion. The critical element of protection measured is the ability of the RECP to absorb the impact force of raindrops, thereby reducing soil particle loosening through "splash" mechanisms. The test method utilizes a laboratory-scale testing apparatus, rather than full-scale field simulation.

Apparatus and Procedure.

8 inch diameter (20.3 cm), 4 inch (10.2 cm) deep post containing both bare and RECP-protected soil are positioned in an incline structure comprised of three adjacent "runoff ramps" each measuring 35 inches (90 cm) long by 10 inches (25.4 cm) wide and having an opening at their lower ends to accommodate recessed pots. The entire incline structure is exposed to simulate rainfall causing both rainfall and runoff to erode the soil-filled pots for 30 minutes. Rainfall is simulated using a laboratory drip-type simulator capable of creating uniform drops with a median diameter of 3.0 to 3.5 mm from a drop height of approximately 2 m and producing rainfall intensities as high as 150 mm/hr. The amount of soil that splashes or is washed out of the containers is collected and weighed. From this data, an appropriate soil loss ratio can be calculated by comparing the RECP-protected soil loss to the control for a given soil type, slope and rainfall intensity.

ECTC's Channel Erosion Test.

The ECTC test method titled, "Standard Index Test Method for Determination of Unvegetated Rolled Erosion Control Product (RECP) Ability to Protect Soil from Hydraulically-Induced Shear Stresses Under Bench-Scale Conditions" establishes the procedures for evaluating the ability of Rolled Erosion Control Products (RECPs) to protect soils from flow-induced erosion. The test method utilizes a laboratory-scale testing apparatus, rather than full-scale field simulation.

Apparatus and Procedures.

8 inch (20.3 cm) diameter, 4 inch (10.2 cm) deep pots containing RECP-protected soil are immersed in water, and the surface is subjected to shear stresses caused by the rotation of an impeller for 30 minutes. The shear stress test apparatus includes a tank, an internal "table" to hold recessed pots, and an impeller. The impeller is mounted in the cylindrical tank so that the lower edge of the blades is slightly above the surface of the pots. The internal table has openings that hold the pots of soil. When pots are placed in the table openings, the test surface is flush with the top of the table. The amount of soil that erodes is found from weighing the containers of saturated soil both before and after testing. Tests are commonly run at multiple (at least three) shear stress levels. From this data the shear stress associated with a critical amount of soil loss (typically 0.5 in (1.25 cm)) can be calculated. The critical shear stress is sometimes referred to as the "permissible shear stress" of the RECP.

ECTC's Mulching Test.

The test method titled, "Standard Index Test Method for Determination of Temporary Degradable Rolled Erosion Control Product (RECP) Performance in Encouraging Seed Germination and Plant Growth" establishes the procedures for evaluating the ability of RECP's to encourage seed germination and initial plant growth. The results of the test can be used to compare RECPs and other erosion control methods to determine which are the most effective at encouraging the growth of vegetation in different climates.

Apparatus and Procedures.

8 inch (20.3 cm) diameter, 4 inch (10.2 cm) deep pots of soil are sown with seeds and then covered with an RECP. Additional containers are left uncovered as controls. The light, water, and temperature are regulated and documented. The rate of germination is measured periodically throughout the test, and the weight of vegetation is calculated by comparing the covered results to the control.

SUMMARY OF TEST RESULTS

The following ASTM tests were conducted using Samples A and B. Sample A was an existing TRM, employing round monofilament fibers for the non-woven mat. Sample B was a TRM of the present invention, employing multi-dimensional fibers for the non-woven mat. Where a control was provided, no TRM was employed over the soil. Each test provides a physical property e.g. tensile strength, first for a B sample, followed by an A sample. Tests results have been reported in Tables I through IV. Tensile testing, reported in Table II, was conducted according to ASTM D 6818. Resiliency, reported in Table III, was conducted according to ASTM D 6524. The surface area of the Sample A product was 5.56 m$^2$ and the surface area of the Sample B product was 7.99 m$^2$, a 44% increase.

TABLE I

Germination Testing

| Property | Units | Day | Control | Sample B | Sample A |
|---|---|---|---|---|---|
| First Round of Test | | | | | |
| Seeds germinated per area | # per 4 sq. in. area | 21 | 1.1 | 11.8 | 6.9 |
| Average pit height | inch | 21 | 0.4 | 2.2 | 1.9 |
| Plant mass per area | mg per 4 sq. in. | 21 | 1 | 10.7 | 9.9 |
| Second Round of Test | | | | | |
| Seeds germinated per area | # per 4 sq. in. area | 14 | 1.8 | 10.7 | 10.7 |
| | | 21 | 4.9 | 13.1 | 10.9 |
| Average pit height | inch | 14 | 1.7 | 3.3 | 2.3 |
| | | 21 | 2.3 | 3.6 | 3.4 |
| Plant mass per area | mg per 4 sq. in. | 21 | 7.6 | 17.7 | 18.7 |
| Third Round of Test | | | | | |
| Seeds germinated per area | # per 4 sq. in. area | 14 | 3.8 | 13.7 | 12.6 |
| | | 21 | 3.9 | 14.7 | 14.3 |
| Average pit height | inch | 14 | 1.5 | 2.4 | 2.6 |
| | | 21 | 1.8 | 3.2 | 3.3 |
| Plant mass per area | mg per 4 sq. in. | 21 | 10.6 | 31.6 | 28.6 |

With reference to the first round of tests, after 21 days, the Sample B product showed a 71% improvement over the Sample A product for seed germinated per area. For average pit height, the improvement of Sample B over Sample A was 16% and for plant mass per area, the improvement of Sample B over Sample A was 8%.

With reference to the second round of tests, after 14 days, the Sample B product showed no improvement over the Sample A product for seed germinated per area while after 21 days, the Sample B product showed a 20% improvement over the Sample A product. For average pit height, the improvement of Sample B over Sample A was 43% after 14 days and 6% after 21 days. For plant mass per area, there was no improvement after 21 days.

With reference to the third round of tests, after 14 days, the Sample B product showed a 9% improvement over the Sample A product for seed germinated per area while after 21 days, the Sample B product showed a 3% improvement over the Sample A product. For average pit height, there was no improvement of Sample B over Sample A after 14 days and after 21 days. For plant mass per area, there was a 10% improvement after 21 days.

TABLE II

Tensile Testing

| Property | Units | | Sample B | Sample A |
|---|---|---|---|---|
| First Round of Test | | | | |
| Tensile | lb/ft | md | 512 | 465 |
| | | xmd | 488 | 320 |
| Second Round of Test | | | | |
| Tensile | lb/ft | md | 521 | 440 |
| | | xmd | 467 | 325 |
| Third Round of Test | | | | |
| Tensile | lb/ft | md | 586 | 405 |
| | | xmd | 516 | 388 |
| Fourth Round of Test | | | | |
| Tensile | lb/ft | md | 541 | 444 |
| | | xmd | 453 | 320 |

With reference to the first round of tests, the Sample B product showed a 10% improvement over the Sample A product in tensile strength in the machine direction and a 53% improvement over the Sample A product in the cross-machine direction.

With reference to the second round of tests, the Sample B product showed an 18% improvement over the Sample A product in tensile strength in the machine direction and a 44% improvement over the Sample A product in the cross-machine direction.

With reference to the third round of tests, the Sample B product showed a 45% improvement over the Sample A product in tensile strength in the machine direction and a 353% improvement over the Sample A product in the cross-machine direction.

With reference to the fourth round of tests, the Sample B product showed a 22% improvement over the Sample A product in tensile strength in the machine direction and a 42% improvement over the Sample A product in the cross-machine direction. Overall, the average improvement was 33%.

TABLE III

Resiliency

| Property | Units | Sample B | Sample A |
|---|---|---|---|
| First round of test | % | 93 | 82 |
| Second round of test | % | 87 | 78 |
| Soil Loss | SLR | 0.14 | 0.15 |

With reference to the first round of tests, the Sample B product showed a 13% improvement over the Sample A product in resiliency and a 12% improvement over the Sample A product in the second round of tests, for an average improvement of 12.5%. Finally, soil loss was 7% less for the Sample B product over the Sample A product.

Finally, test sets were designed to evaluate an RECP's ability to provide channel protection for a selected soil and a range of flow-induced shear stresses. The results of the testing include the amount of soil lost at various shear stresses. From this data, an appropriate permissible shear (tp) can be calculated by assuming a critical amount of soil loss (typically 13 mm). The results of this test are presented in Table IV.

TABLE IV

Erosion Testing

| Test | Tested Materials | Test Parameters | Test Results |
|---|---|---|---|
| Shear-induced Erosion | Sample B | Silty-sand; 65-70% Vegetated | tp = 6.4 psf |
| | Sample A | Silty-sand; 65-70% Vegetated | tp = 6.8 psf |

(Key: tp = permissible shear)

The results of Table IV indicate that Sample B had a 6% better shear stress than Sample A.

Thus it should be evident that the turf reinforcement mat and method of the present invention are highly effective in preventing erosion from exposed surfaces and promoting revegetation of previously eroded surfaces. The invention is particularly suited for erosion control and promotion of revegetation of a previously eroded land surface, but is necessarily limited thereto.

Based upon the foregoing disclosure, it should now be apparent that the use of the turf reinforcement mat described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, multi-dimensional polymer fibers according to the present invention are not necessarily limited to those having a tri-lobal cross section. Thus, the scope of the invention shall include all modifications and variations that may fall within the scope of the attached claims.

What is claimed is:

1. A method for erosion control and revegetation facilitation comprising:
    a) providing a turf reinforcement mat comprising
        at least one polymer net layer,
        a non-woven mat comprising a plurality of drawn tri-lobal polymer fibers, wherein a cross-section of each of the tri-lobal fibers includes:
            three substantially convex lobes substantially equidistant from each other and joined together at the center of the fiber;
            three substantially concave channels between the lobes; and,
        a polymer yarn, stitching said at least one polymer net layer to said non-woven mat;
    b) laying said turf reinforcement mat on a section of ground to be reinforced;
    c) securing said turf reinforcement mat to the ground;
    d) distributing soil and seed onto said turf reinforcement mat such that the section of ground is quickly revegetated and thereby protected from further erosion.

2. A method for erosion control and revegetation facilitation as set forth in claim 1, wherein each of said drawn tri-lobal polymer fibers is selected from the group consisting of polyolefins, polyesters, polyamides and blends thereof.

3. A method for erosion control and revegetation facilitation as set forth in claim 1, wherein each of said drawn tri-lobal polymer fibers has a length from about 2 inches (5 cm) to about 12 inches (30 cm).

4. A method for erosion control and revegetation facilitation as set forth in claim 1, wherein each of said drawn tri-lobal polymer fibers has a denier of from about 300 (333 decitex) to about 2000 (2222 decitex).

5. A method for erosion control and revegetation-facilitation as set forth in claim 4, wherein each of said drawn tri-lobal polymer fibers has a denier of from about 500 (555 decitex) to about 1100 (1222 decitex).

6. A method for erosion control and revegetation facilitation as set forth in claim 1, wherein the polymer of said net layer is selected from the group consisting of polyolefins, polyesters, polyamides and blends thereof.

7. A method for erosion control and revegetation facilitation as set forth in claim 1, further comprising a second polymer net layer, said non-woven mat being located between said first polymer net layer and second polymer net layer.

* * * * *